United States Patent
Wulfe et al.

(10) Patent No.: US 11,807,272 B2
(45) Date of Patent: Nov. 7, 2023

(54) SYSTEMS AND METHODS FOR MULTIPLE ALGORITHM SELECTION

(71) Applicant: TOYOTA RESEARCH INSTITUTE, INC., Los Altos, CA (US)

(72) Inventors: Blake Warren Wulfe, San Francisco, CA (US); Guy Rosman, Newton, MA (US); Noah J. Epstein, Cambridge, MA (US); Luke D. Fletcher, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 88 days.

(21) Appl. No.: 16/941,434

(22) Filed: Jul. 28, 2020

(65) Prior Publication Data
US 2022/0032957 A1 Feb. 3, 2022

(51) Int. Cl.
| | |
|---|---|
| *B60W 60/00* | (2020.01) |
| *G06N 5/02* | (2023.01) |
| *G07C 5/08* | (2006.01) |
| *B60W 30/095* | (2012.01) |
| *G08G 1/00* | (2006.01) |
| *G01C 21/34* | (2006.01) |

(52) U.S. Cl.
CPC .... *B60W 60/0016* (2020.02); *B60W 30/0956* (2013.01); *B60W 60/0011* (2020.02); *B60W 60/0027* (2020.02); *G01C 21/3407* (2013.01); *G06N 5/02* (2013.01); *G07C 5/085* (2013.01); *G08G 1/22* (2013.01)

(58) Field of Classification Search
None
See application file for complete search history.

(56) References Cited

U.S. PATENT DOCUMENTS

| | | |
|---|---|---|
| 5,424,772 A | 6/1995 | Aoki |
| 8,855,847 B2 | 10/2014 | Uehara |
| 9,754,325 B1 | 9/2017 | Konrardy |
| 9,830,704 B1 | 11/2017 | Mishra |
| 9,874,878 B2 | 1/2018 | Wang |
| 10,449,957 B2 | 10/2019 | Nagy |

(Continued)

*Primary Examiner* — James J Lee
*Assistant Examiner* — David Hatch
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods of model or prediction algorithm selection are provided. An autonomous control system may include a perception component that, based on environmental inputs regarding an object(s), a vehicle's operating characteristics, etc., outputs a current state of the vehicle's surrounding environment. This in turn, is used as input to a prediction component comprising a plurality of prediction algorithms. The prediction component outputs a set of predictions regarding the trajectory of the object(s). Accordingly, for each object, a set of trajectories at specific timesteps may be generated by the different prediction algorithms which are input to a planner component. These trajectories may then be analyzed, compared, or otherwise processed to determine which trajectory regarding the object is most accurate. The prediction algorithm or model that produced the most accurate predicted trajectory may then be used for subsequent predictions/timesteps.

15 Claims, 8 Drawing Sheets

(56) References Cited

U.S. PATENT DOCUMENTS

| | | |
|---|---|---|
| 2015/0149017 A1 | 5/2015 | Attard |
| 2017/0315531 A1 | 11/2017 | Aparicio Ojea |
| 2018/0120843 A1 | 5/2018 | Berntorp |
| 2018/0314947 A1 | 11/2018 | Morris, II |
| 2019/0285418 A1 | 9/2019 | Rohde |
| 2020/0033855 A1 | 1/2020 | Jammalamadaka |
| 2020/0089238 A1 | 3/2020 | McGill, Jr. |
| 2020/0298891 A1* | 9/2020 | Liang .................... G01S 17/89 |
| 2021/0304018 A1* | 9/2021 | Usman ................ G06F 11/3409 |
| 2021/0382489 A1* | 12/2021 | Goyal ................. G05D 1/0214 |

* cited by examiner

SYSTEMS AND METHODS FOR MULTIPLE ALGORITHM SELECTION

TECHNICAL FIELD

The present disclosure relates generally to autonomous driving, and in particular, some implementations may relate to selecting an optimal or preferable object movement prediction algorithm on which autonomous driving control can be based.

DESCRIPTION OF RELATED ART

Advanced driver-assistance systems (ADAS) can refer to electronic systems that assist a vehicle operator while driving, parking, or otherwise maneuvering a vehicle. ADAS can increase vehicle and road safety by minimizing human error, and introducing some level of automated vehicle/vehicle feature control. Autonomous driving systems may go further than ADAS by leaving responsibility of maneuvering and controlling a vehicle to the autonomous driving systems. For example, an autonomous driving system may comprise some package or combination of sensors to perceive a vehicle's surroundings, and advanced control systems that interpret the sensory information to identify appropriate navigation paths, obstacles, road signage, etc.

BRIEF SUMMARY OF THE DISCLOSURE

In accordance with one embodiment, a vehicle may comprise an autonomous control system adapted to provide one or more commands to autonomously control one or more systems of the vehicle. The vehicle may further comprise an obstacle recognition unit adapted to: apply a plurality of prediction algorithms to a state of an object generating a plurality of predictions regarding object trajectory; and determine which of the plurality of prediction algorithms generates a most accurate prediction of the plurality of predictions regarding trajectory of the object. Further still, the vehicle may comprise a navigation plan generation unit adapted to generate a navigation plan based on the most accurate prediction of the plurality of predictions regarding the trajectory of the object and according to which, the vehicle is autonomously controlled.

In some embodiments, to determine which of the plurality of prediction algorithms generates a most accurate prediction, the obstacle recognition unit predicts a position of the object at a first timestep using each of the plurality of prediction algorithms. In some embodiments, the obstacle recognition unit further determines an actual position of the object at a second timestep subsequent to the first timestep. In some embodiments, the obstacle recognition unit further computes a likelihood associated with each of the plurality of prediction algorithms based on a comparison between the prediction position of the object and the actual position of the object.

In some embodiments, the obstacle recognition unit further computes a likelihood associated with each of the plurality of prediction algorithms over a set of past timesteps, wherein error associated with each predicted position of the object is computed at each timestep of the set of past timesteps.

In some embodiments, to determine which of the plurality of prediction algorithms generates a most accurate prediction, the obstacle recognition unit collects log data from a plurality of vehicles and applies each of the prediction algorithms to the collected log data. In some embodiments, the obstacle recognition unit further collects a dataset from the application of each of the prediction algorithms, the dataset comprising a first subset of data to be used as input to a classification algorithm, the first subset of data comprising one or more characteristics of a driving experience represented by the log data. In some embodiments, the dataset comprises a second subset of data to be specified as a desired output of the classification algorithm, wherein the desired output comprises one of the plurality of prediction algorithms generating the most accurate prediction. In some embodiments, obstacle recognition unit determines the desired output based on the one of the plurality of prediction algorithms having a lowest error over a given time horizon or a per-prediction algorithm reliability assessment. In some embodiments, the obstacle recognition unit further deploys the one of the plurality of prediction algorithms generating the most accurate prediction, and upon receiving data commensurate with the first subset of data used as the input to the classification algorithm, outputs the one of the plurality of prediction algorithms to predict a trajectory of one or more obstacles currently encountered by the vehicle.

In some embodiments, to determine which of the plurality of prediction algorithms generates a most accurate prediction, the obstacle recognition unit determines a confidence value associated with each of the plurality of prediction algorithms. In some embodiments, the obstacle recognition unit further determines a priority of use of the plurality of prediction algorithms, and wherein the obstacle recognition unit selects one of the plurality of prediction algorithms to predict a trajectory of one or more obstacles currently encountered by the vehicle based on the priority of use and whether the confidence value associated the one of the plurality of prediction algorithms meets or exceeds a confidence threshold.

In some embodiments, the determining of which of the plurality of prediction algorithms generates the most accurate prediction of the plurality of predictions regarding trajectory of the object is performed at each of a plurality of timesteps. In some embodiments, the determining of which of the plurality of prediction algorithms generates the most accurate prediction of the plurality of predictions regarding trajectory of the object comprises determining an error associated with each of the plurality of prediction algorithms at each of the plurality of timesteps. In some embodiments, the determining of which of the plurality of prediction algorithms generates the most accurate prediction of the plurality of predictions regarding trajectory of the object further comprises applying a weighting filter to the error associated with each of the plurality of prediction algorithms. In some embodiments, the weighting filter weighs errors associated with past timesteps differently than errors associated with a current timestep.

In some embodiments, the most accurate prediction of the plurality of predictions regarding trajectory of the object differs according to at least one of downstream application and time horizon under consideration.

In some embodiments, a method of autonomously controlling a vehicle comprises: generating a plurality of predictions regarding trajectory of an object based on a state of the object at one or more timesteps; determining which of a plurality of prediction algorithms generating the plurality of prediction results in a most accurate prediction of the trajectory of the object; generating a navigation plan based on the most accurate prediction of the plurality of predictions regarding the trajectory of the object; and generating control signals to autonomously control the vehicle in accordance with the navigation plan. In some embodiments, the determining of which of the plurality of generated prediction algorithms results in the most accurate prediction comprises determining which of the plurality of predictions has a highest confidence level or a lowest error. In some embodiments, the method further comprises determining which of the plurality of prediction algorithms is associated with a highest priority upon two or more of the plurality of predictions algorithms generating predictions having the same confidence level or some error.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
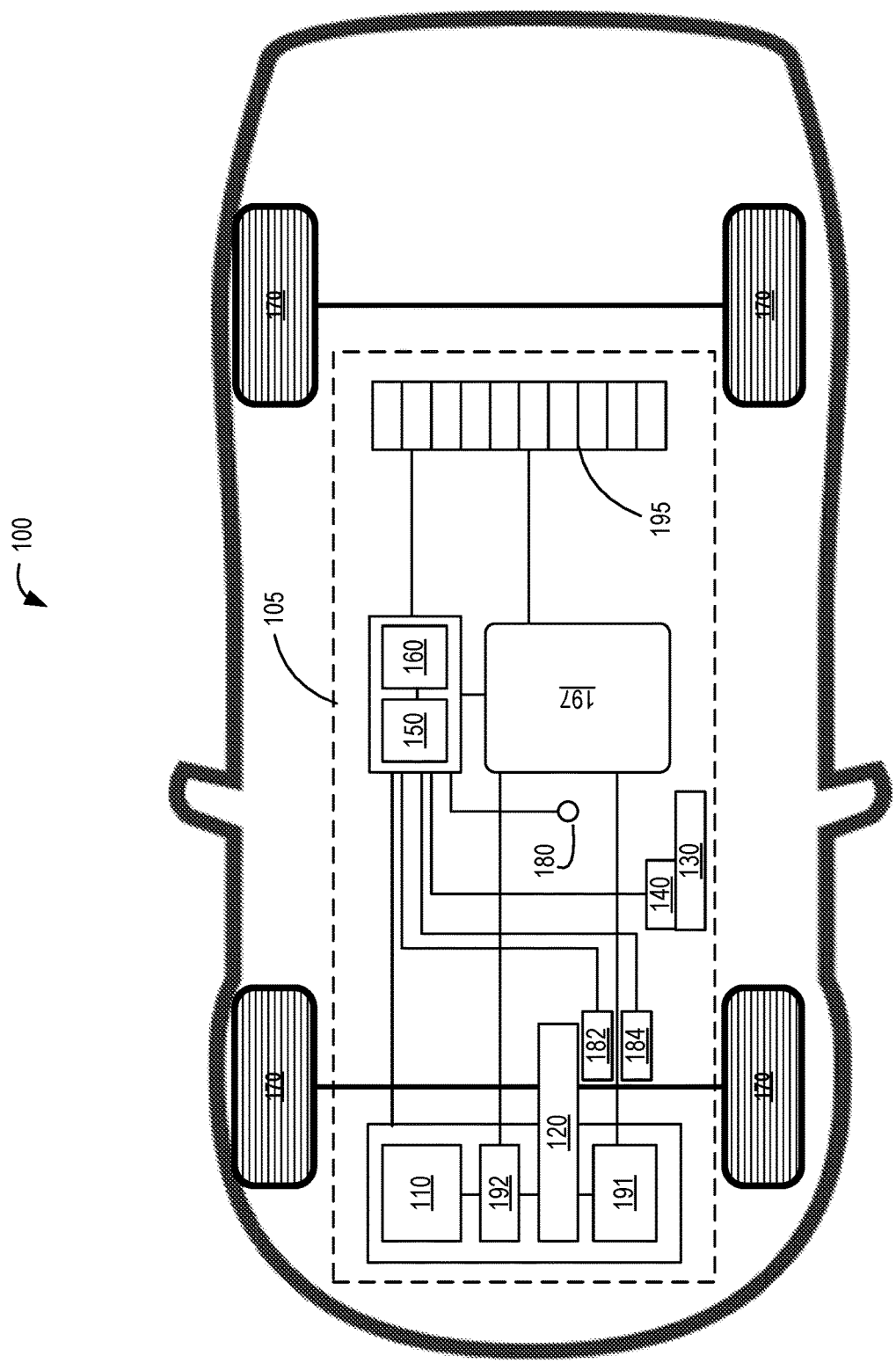
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

As alluded to above, ADAS and autonomous driving control systems can be used in vehicles that at least, in part, controls or manages vehicle operation to provide varying levels of automated control or assistance. For ease of reference, the term "autonomous control" will be used herein to refer to such systems. Implementing autonomous control in vehicles often involves the use of one or more algorithms for predicting the movement of objects or obstacles (or sets of objects/obstacles) that a vehicle may encounter while operating autonomously. In this way, the vehicle can be autonomously controlled to safely react to, avoid, or otherwise deal with such objects/obstacles. For example, prediction algorithms may be used by an autonomous control system of a vehicle to determine how the vehicle should operate in the vicinity of a pedestrian at or approaching an intersection where the vehicle is located or is also approaching.

In conventional autonomous control systems, "fixed" or "binary" methods of assigning algorithms for use in predicting object movement are typically used. For example, if a vehicle encounters or is about to encounter a pedestrian, in conventional autonomous control systems, a particular algorithm may be used to predict future movement of pedestrians. However, if another type of object is at issue, another algorithm may be used. There are typically no other options for prediction algorithms in conventional autonomous control systems. This can result in sub-optimal predictions. For example, different algorithms may be better suited to predicting object movement depending on, e.g., the type of object for which movement is being predicted, the relevant time horizon over which movement is being predicted, etc.

Accordingly, various embodiments are directed to systems and methods of model or prediction algorithm selection in near real-time. In some embodiments, an autonomous control system may include a perception component that, based on environmental inputs regarding an object/set of objects, a vehicle's operating characteristics, etc., may output a current state of the vehicle's surrounding environment. Information that is output from the perception component may be used as input to a prediction component comprising a plurality of prediction algorithms.

The prediction component may in turn output a set of predictions regarding the trajectory of the objects/set of objects. For example, the prediction component may include a physics-based algorithm and a learned trajectory-generation algorithm. Accordingly, for each object, a set of trajectories at specific timesteps may be generated by the different prediction algorithms.

A planner or decision component may receive, as input, the various predictions, in this case, trajectories. These trajectories may then be analyzed, compared, or otherwise processed to determine which trajectory regarding the object is most accurate. The prediction algorithm or model that produced the most accurate predicted trajectory may then be used for subsequent predictions/timesteps. That is, the performance of prediction algorithms can be monitored as they are being utilized to determine which is the most effective/ which is optimal given one or more considerations, e.g., operating environment, type of object, the amount of control or lack thereof that a driver may have in a particular scenario, etc. Upon determining an optimal prediction algorithm (given a particular object(s) and/or condition/set of conditions), that optimal prediction algorithm can be used when that object(s) and/or condition/set of conditions is encountered again, and the autonomous control system attempts to predict the movement of an object(s).

It should be understood that various embodiments are not limited to any particular algorithm/set of algorithms. Again, various embodiments are directed to selecting which prediction algorithm or model to use in a given situation or circumstance, which can include a particular locale, a particular object(s), a particular time horizon over which a prediction is to be made, etc. Moreover, although various embodiments are described in the context of object movement prediction, embodiments can be adapted for application to other contexts where model/prediction algorithm selection would be useful to better align use case scenarios to a particular model/prediction algorithm.

It should also be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The systems and methods disclosed herein may be implemented with or by any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed ($N_E$) of engine 110 independently of the vehicle speed (V).

ECU 150 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG191. It should be understood that in embodiments where MG191 and MG192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
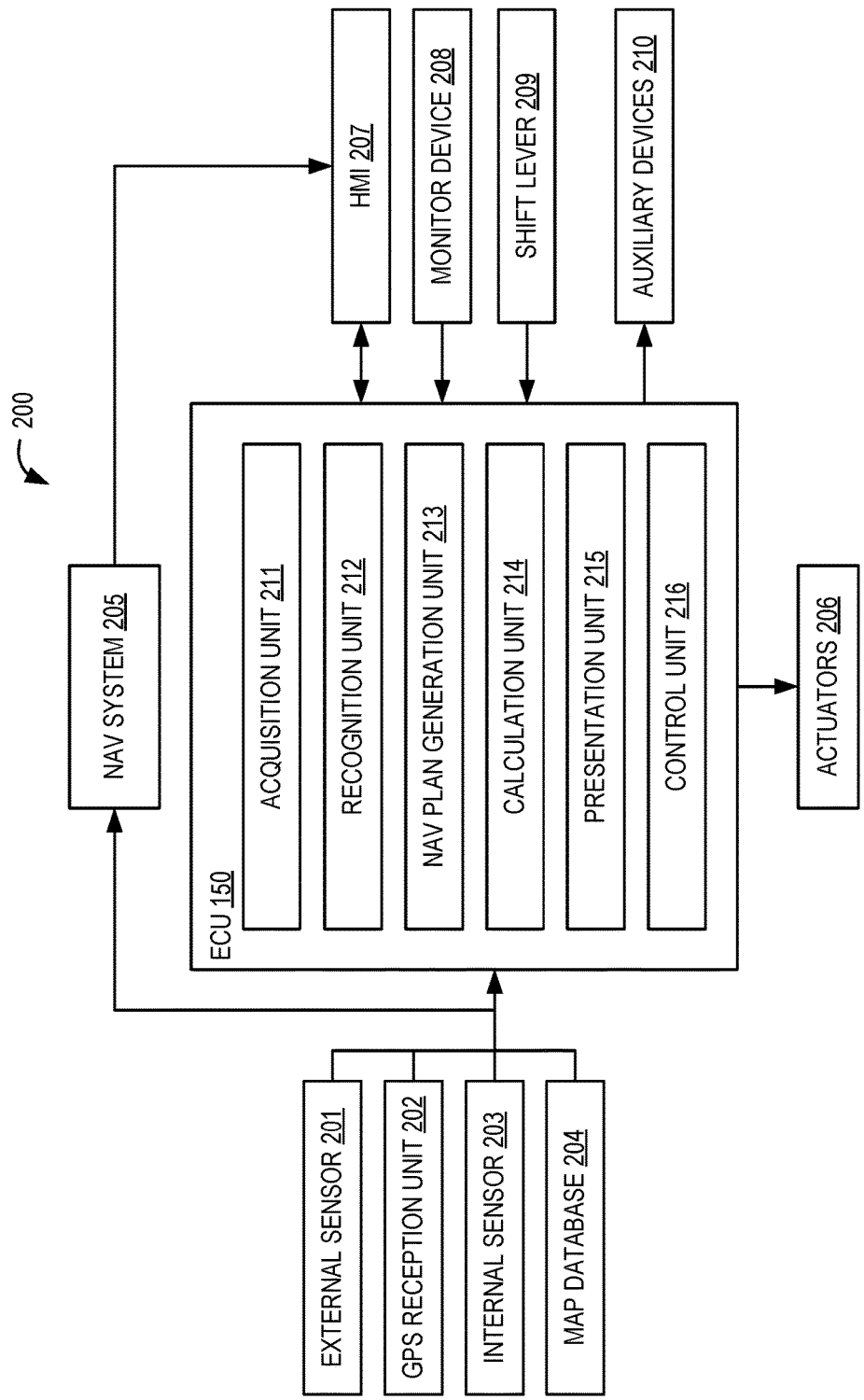
FIG. 2 illustrates an example autonomous control system.

FIG. 2 illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, generally movement of the vehicle, without depending or relying on driving operations/directions by a driver or operator of the vehicle.

As an example, autonomous control may include a lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation.

As another example, autonomous control may include navigation control, where when there is no preceding vehicle in front of the HEV 100, constant speed (cruise) control is effectuated to make HEV 100 run at a predetermined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold. When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control. As will be discussed in greater detail below, autonomous control system 200 may make certain determinations regarding whether to comply or proceed with autonomous control based on a command from autonomous control system 200. For example, considerations regarding recoverability and vehicle control under certain conditions may be considered as factors in determining whether or not autonomous control can be safely executed. Such considerations may also be reflected as thresholds for comparison.

For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver.

In the example shown in FIG. 2, autonomous control system 200 is provided with an external sensor 201, a GPS (Global Positioning System) reception unit 202, an internal sensor 203, a map database 204, a navigation system 205, actuators 206, an HMI (Human Machine Interface) 207, a monitor device 208, a shift lever 209, auxiliary devices 210. Autonomous control system 200 may communicate with ECU 150, or in some embodiments (may be implemented with its own ECU).

In the example shown in FIG. 2, external sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

In the example shown in FIG. 2, GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

In the example shown in FIG. 2, the internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and operation buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an object or obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle. As will be described in greater detail below, when the obstacle recognition unit recognizes moving objects, an optimal prediction algorithm or model for predicting the movement or trajectory of such objects can be selected for use.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit 214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 216 executes a switching from autonomous control to manual control.

Referring to FIG. 2B, control unit 216 operatively interacts with safety control unit 220 that determines whether or not autonomous control system 200 (in particular, control unit 216) can engage (activate, start) in autonomous control of HEV 100. For example, safety control unit 220 may include one or more determination units, e.g., determination unit 222a determines whether or not autonomous control can be engaged, based on a difference between a vehicle position calculated from signals received by the GPS reception unit 202 and an actual vehicle position calculated based on an output signal from the external sensor 201, the map information of the map database 204 and so forth. For example, a threshold condition associated with engagement of autonomous control in HEV 100 may be predicated on travel along a certain type of roadway, e.g., known segment(s) of road within map database 204, such as a freeway (versus) country lane. Road curvature may be another condition/characteristic on which autonomous control of HEV 100 may be based. Determination unit 222a may make its determination based on one or more determinative factors.

Control unit 216 may further interact with a determination unit 222b of safety control unit 220 that determines whether or not a trigger to deactivate (stop) an autonomous control mode exists. For example, determination unit 222b can determine whether or not to execute the switch from the autonomous control to manual control based on the level of steering wheel actuation, brake pedal actuation, etc. effectuated by the driver while HEV 100 is being operated in an autonomous control mode, which is obtained by the acquisition unit 211. Other determinative factors or considerations may be the amount of acceleration or deceleration experienced by HEV 100, also determined by acquisition unit 211. When determination unit 222 determines that the autonomous control can be engaged, based on the determinations performed by determination units 222a and/or 222b, control unit 216 engages autonomous control of HEV 100. That is, determination unit 222 may act as a determination aggregator that aggregates determinations rendered by other determination units. Determination unit 222 may be a circuit, e.g., application-specific integrated circuit, logic, software, or some combination thereof that processes the individual determinations rendered by the other determination units (e.g., determination units 222a and 222b) to render an overall determination. That overall determination may control operation of control unit 216, e.g., to disengage autonomous control and switch to manual control or engage in autonomous control.

On the other hand, when determination units 222a and/or 222b determine that a switch from autonomous control to the manual control should be executed, autonomous control is deactivated/disengaged by control unit 216 or control unit 216 is itself deactivated/disengaged, and the driver proceeds to manually control HEV 100. It should be understood that other determination units may be used (or only a single determination unit may be used). In the case of multiple determination units being used, in some embodiments, any single determination that manual control should be executed can serve as a trigger to deactivate autonomous control. In some embodiments, presentation unit 215 is provided with a control state notification unit 215a that notifies the driver of a fact that HEV 100 is operating under autonomous control is in execution, and so forth. Such a notification may be displayed on a display of HMI 207, for example. Likewise, If a switch from autonomous control to the manual control is executed, the control state notification unit 215a displays, on the display of HMI 207 a corresponding notification.

HMI 207, in some embodiments, may include an autonomous control engagement trigger input unit 207a that can be actuated by the driver of HEV 100 to engage in an autonomous control mode (after safety control unit 220 determines that autonomous control can be effectuated).

In some embodiments, the driver of HEV 100 may be able to select an automatic autonomous control engage mode, where autonomous control unit 216 can be automatically engaged when safety control unit 220 determines that the autonomous control can be engaged. In some embodiments, shift lever 209 may be used to set a triggered autonomous control mode and an automatic engage mode (as alluded to above by actuating shift lever 209 to an "A" (AUTOMATIC) position or to a "D" (DRIVE) position.

As alluded to above, various embodiments are directed to selecting a prediction algorithm or model to be used when predicting movement of an object or obstacle during autonomous control of a vehicle. That is, a planner or decision component can be implemented, where the planner component, at particular timesteps, generates or provides an assessment or analysis regarding how well (or poorly) a particular prediction algorithm is performing. The planner component may receive, as input, information regarding the current state of the environment surrounding (or otherwise applicable to) a vehicle, a vehicle's own operating conditions, and/or a vehicle operator's state or condition. The planner component may also receive, as input, the future predictions of all algorithms used to predict object trajectory or movement of each obstacle/set of obstacles in the vehicle's surrounding environment. Based on these inputs, the planner component can determine which prediction algorithm to use for a particular object/set of objects, and if relevant, a particular environment(s), and/or vehicle operating conditions.

For example, depending on the situation, autonomous control system 200 may make a planning decision regarding how HEV 100 is to be autonomously controlled. For example, a planning decision may be made at each timestep or in accordance with some periodic interval, e.g., every 100 ms or every time an external sensor 201 takes a reading (e.g., every 10 images captured by a camera). It should be understood that the frequency of planning decisions can vary depending on the vehicle, its operating characteristics, a manufacturer's desired response time to identifying an obstacle, and so on. In other words, whenever deemed appropriate, an opportunity to determine how well a set of prediction algorithms is performing may be taken.

Because different prediction algorithms or models can perform better or worse in different situations in the real world, selecting the best or optimal prediction algorithm would benefit prediction accuracy so that autonomous control of a vehicle, e.g., HEV 100 can react to or otherwise handle obstacles in a safe manner and/or that provides a desirable driving experience. For example, a neural network predictor may work well (i.e., make accurate predictions) when observing data in its training distribution. That is, the neural network predictor may make accurate predictions when the data on which predictions are based is the same/similar to data on which the neural network predictor was trained. However, if the data on which predictions are based (when the neural network predictor has actually been deployed or is operationalized) differs from the data used to train the neural network predictor, the neural network predictor will likely perform poorly.

To illustrate, consider an example where a neural network predictor is configured or designed to predict the trajectory of pedestrians at intersections. The data used to train the neural network predictor may comprise data regarding pedestrians in a particular city where pedestrians typically abide by traffic rules, and cross intersections within a cross-walk. Based on this city-specific pedestrian data, the neural network predictor may become accurate at predicting pedestrian movement or trajectory at intersections within that particular city. However, if the neural network predictor is deployed in a different city, where pedestrians tend not to cross intersections without staying within the confines of defined cross-walks, the neural network predictor's prediction will likely be inaccurate.

Consider another example, where a lane merge predictor is used to predict vehicle behavior over a typical time horizon associated with vehicles merging onto a freeway. That lane merge predictor may not provide an accurate prediction regarding vehicle movement when detected vehicles are, e.g., further away from the vehicle, and are traveling in city traffic. Although vehicles may still merge in/out of lanes, a more appropriate predictor may be a traffic pattern-based predictor applicable over a different time horizon.

Yet another example of when one prediction algorithm may not be suitable for a particular scenario or circumstance includes downstream uses. That is, one prediction algorithm may be better suited to predicting obstacle trajectory for ADAS-controlled vehicle maneuvers (requiring less precision or accuracy due to the possibility of human operator intervention) versus another prediction algorithm better suited for more accurate obstacle trajectory prediction in total autonomously-controlled vehicle maneuvers.

Figure 3A:
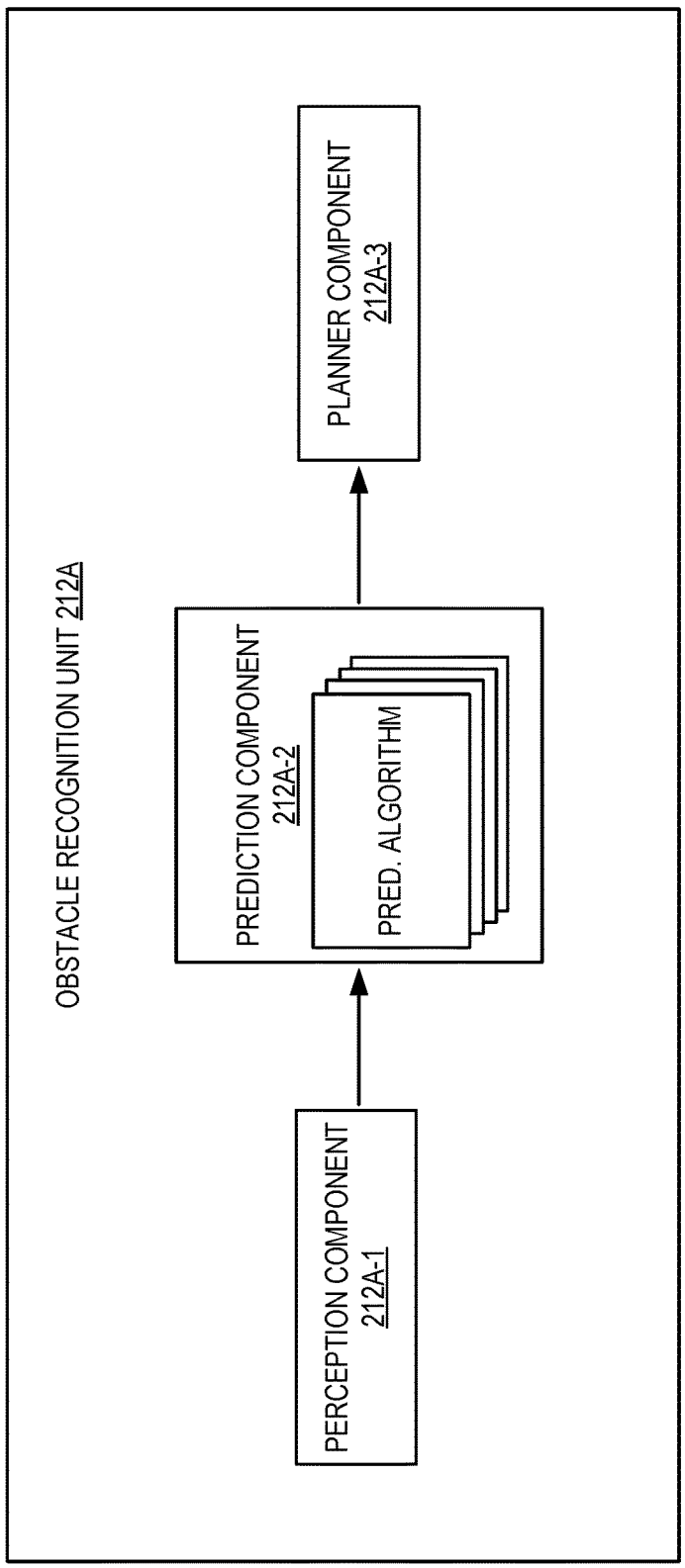
FIG. 3A is a schematic representation of an example prediction algorithm selection mechanism in accordance with various embodiments.
Figure 3B:
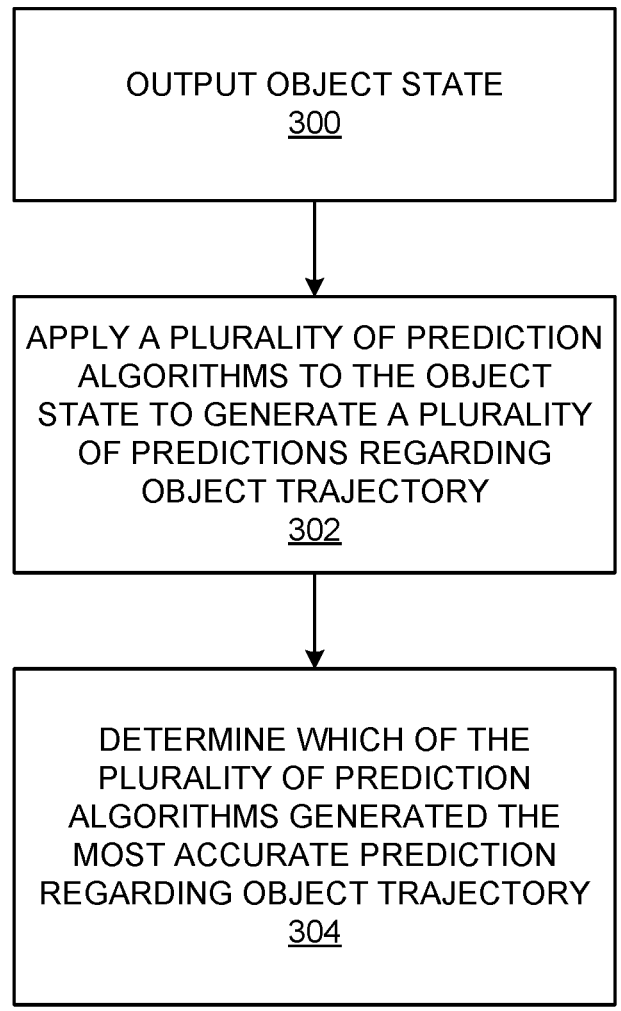
FIG. 3B is a flow illustrating example operations that may be performed to effectuate the prediction algorithm selection mechanism of FIG. 3A.

As indicated above, recognition unit 212 may comprise an obstacle recognition unit for identifying and predicting the trajectory of moving objects. FIG. 3A illustrates a schematic representation of obstacle recognition unit 212A. FIG. 3B is a flow chart illustrating example operations that may be performed to effectuate prediction algorithm selection in accordance with various embodiments, and will be described in conjunction with FIG. 3A.

As illustrated in FIG. 3A, obstacle recognition unit 212A may include a perception component 212A-1, a prediction component 212A-2, and a decision component 212A-3. As illustrated in FIG. 3B, at operation 300, an object state may be output. That is, perception component 212A-1 may output information regarding a physical state(s) of one or more objects detected by HEV 100, e.g., via external sensor 201, the vehicle's location, e.g., via GPS reception unit 202, the vehicle's operating conditions, e.g., via internal sensor 203, etc. For example, LIDAR may be used to detect and determine the position of one or more vehicles, pedestrians, non-motorized vehicles, etc. relative to HEV 100. Based on such information, perception component 212A-1 may output a state of each such object, including for example, position, velocity, acceleration, and heading associated with each object. It should be noted that the information output by perception component 212A-1 can differ depending on the object(s) at issue, or an aspect of the object(s)' state. For example, if an object is stationary, there may not be associated velocity/acceleration data for the object.

Prediction component 212A-2 may comprise an aggregation or collection of prediction algorithms or models. For example, prediction component 212A-2 may comprise a variety of different prediction algorithms/models that are used to predict the movement or trajectory of detected objects. Accordingly, at operation 302, a plurality of prediction algorithms can be applied to the object state (output by perception component 212A-1) (which can be replicated across the different prediction algorithms/models to generate a plurality of predictions regarding object trajectory. That is, prediction component 212A-2 may apply a plurality of prediction algorithms to the information output by perception component 212A-1 to generate multiple predictions. For example, prediction component 212A-2 may include a physics-based algorithm and a learned trajectory-generation algorithm that can be applied to the information regarding the one or more detected objects. It should be understood that some prediction algorithms may have certain prerequisites prior to use. Accordingly, application of one or more prediction algorithms or models to the information output by perception component 212A-a may be premised on whether or not a particular prediction algorithm's input prerequisites are met by the information. For example, a pedestrian predictor may be used only if one or more pedestrians is detected as being an object/obstacle of interest to vehicle. It should be understood that a collection of prediction algorithms/models may be maintained, from which applicable ones are selected and applied. The results are evaluated, and as described herein, used to select the prediction algorithm to use going forward. If only one prediction algorithm is relevant, that prediction algorithm can simply be used directly (without evaluation).

Prediction component 212A-2 may, as a result of applying each of the relevant or appropriate prediction algorithms to the information output by perception component 212A-1 and received as input by prediction component 212A-2, output a prediction from each of the prediction algorithms. For example, for each detected object or set of objects, prediction component 212A-2 may output a set of trajectories with weights, where trajectory can refer to, e.g., a sequence of positions (or more generally, states) at specific timesteps. It should be noted that this predicted "state," and the aforementioned object state are, in a sense, the same, i.e., the object state can refer, e.g., to physical position, velocity, acceleration, heading at the current time versus the prediction, which is that same state at a future point in time.

At operation 304, a determination is made regarding which prediction algorithm generates the most accurate object trajectory prediction. That is, planner component 212A-3 may take, as input, the output of each prediction algorithm applied by prediction component 212A-2 to predict an object or set of objects' trajectory. Based on the predictions output by each of the applied prediction algorithms, planner component 212A-3 may determine which prediction best suits the object/set of objects and/or the operating conditions of the vehicle, environmental conditions, relevant time horizon, desired downstream use, etc. For example, as alluded to above, a scenario may involve providing controls to vehicle 200 to completely, autonomously control the operation of vehicle 200. In other examples, a scenario may involve providing control signals or commands to autonomously control the operation of vehicle 200, in addition to warnings, alerts, and/or other notifications to an operator of vehicle 200.

As will be described above, the manner in which planner component 212A-3 may select a prediction algorithm to use for subsequent predictions regarding an object or set of objects' trajectory can vary. In some embodiments, planner component 212A-3 may select a prediction algorithm for use based on an observed error or likelihood of an observed state. In some embodiments, planner component 212A-3 may select a prediction algorithm for use based on learned classification. That is, state data/information can be used to learn which prediction algorithm to use. In still other embodiments, planner component 212A-3 may determine an optimal prediction algorithm or model to use based on reported confidence. That is, certain prediction algorithms may, in conjunction with outputting a prediction regarding an object(s) trajectory, also output a confidence value associated with its prediction. In such embodiments, planner component 212A-3 may select a prediction algorithm based on, e.g., a highest confidence value associated with a prediction, or meeting/exceeding a confidence value threshold. It should be understood that planner component 212A-3 may be configured to select a prediction algorithm on some basis, e.g., in some scenarios, planner component 212A-3 may be configured to select a prediction algorithm based on highest confidence, while in other scenarios, planner component 212A-3 may be configured to select a prediction algorithm based on confidence meeting/exceeding a threshold. In the event of a tie, e.g., multiple prediction algorithms meet a confidence threshold or have the same confidence value/level, prediction algorithm selection can be based on a determined priority. The application and computational resources available can determine whether multiple prediction algorithms can be used, in accordance with some embodiments. As an example, for warnings, any reasonable confidence predictions can be used in parallel. As a simple planner use case, the highest can be chosen. Thus, while a highest priority prediction algorithm can be selected, multiple predictions may actually be used at the same time.

Depending on the prediction algorithm selected for use by planner component 212A-3, for subsequent predictions, that prediction algorithm can be used to determine the trajectory of one or more objects at issue. Once object(s) trajectory(ies) is/are determined, as described above, navigation plan generation unit 213 can generate a navigation plan for HEV 100. That is, navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The information regarding obstacles may include predicted trajectory information determined using the prediction algorithm selected for use by planner component 212A-3. Control unit 216 may then autonomously control HEV 100 based on such a navigation plan by outputting control signals to actuators 206 to effectuate operation of HEV 100 according to the navigation plan.

It should be understood that prediction algorithms/models may be continuously evaluated (at each timestep), and the results of those evaluations are integrated over time to decide at each timestep, which prediction algorithm/model to use. For example (considering an error/likelihood case), at the first timestep, an algorithm A may be determined to have an error of 0.5 and another algorithm B may be determined to have an error of 1.0. At this timestep, algorithm A would be selected. At a next timestep, algorithm A might have an error of 1.0, and algorithm B might have an error of 0.9. In this example, these values may be filtered. An example of a simple filter would be to weight past errors at 50% and current errors at 100%, so the overall error for algorithm A would be 0.5*0.5+1.0*1.0=1.25, while for algorithm B, overall error would be 0.5*1.0+1.0*0.9=1.4. However, even though the error for algorithm B is smaller at this timestep, the filtered error for A is smaller, and so algorithm A would be selected in accordance with some embodiments. In this way, information can be integrated over time to arrive at a filtered estimate for the error, which is then used to select the algorithm to be used.

Figure 4:
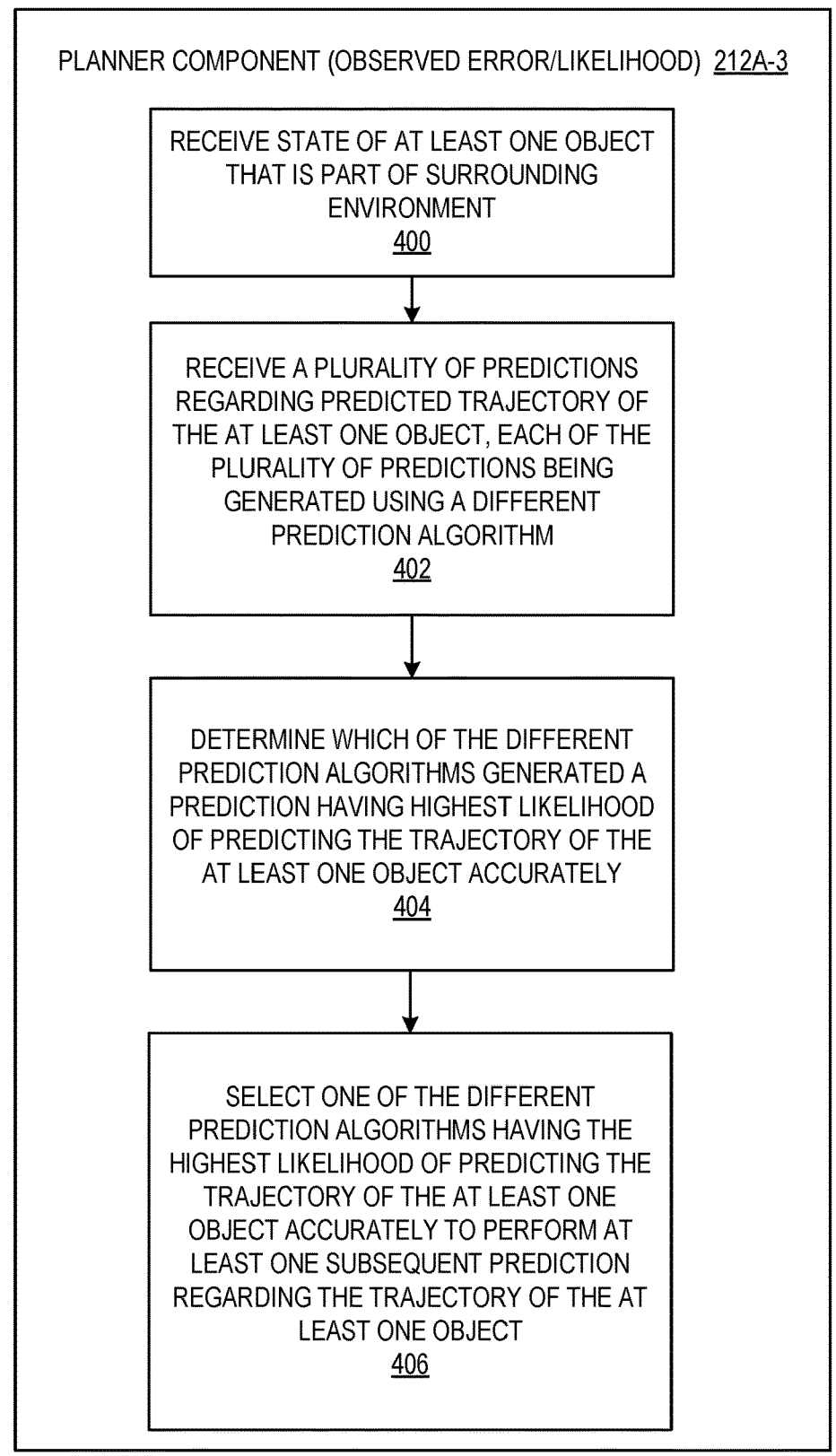
FIG. 4 is a flow chart illustrating example operations performed to select a prediction algorithm in accordance with one embodiment.

As noted above, different methods of selecting a prediction algorithm can be utilized by planner component 213A-3. FIG. 4 is a flow chart illustrating example operations that can be performed to select a prediction algorithm based on observed error/likelihood. At operation 400, the state of at least one object that is part of a vehicle's surrounding environment is received. As described above, that state can be determined by perception component 212A-1 vis-à-vis external sensor 201, internal sensor 203, etc. It should be understood that the state of the at least one object can be received at each timestep. Additionally, predictions made at the previous timestep or multiple timesteps can be received. That is, at operation 402, a plurality of predictions regarding predicted trajectory of the at least one object can be received, each of the plurality of predictions being generated using a different prediction algorithm. The different prediction algorithms may be applied by prediction component 212A-2 as described above.

At operation 404, a determination can be made regarding which of the different prediction algorithms generated a prediction having a highest likelihood of predicting the trajectory of the at least one object accurately. For example, each prediction algorithm may include a function that computes the likelihood of the observed data/state under distribution defined by the prediction algorithm. Consider a scenario where an object being predicted is predicted to have a particular trajectory at timestep 0 (t0) according to one prediction algorithm. Thus, at t0, a state (e.g., position and location) of the object may be predicted. At a subsequent timestep, e.g., timestep 1 (t1), the object is observed to have an actual state (position and location).

Accordingly, planner component 212A-3 may compute likelihood to determine how likely the observed position is under the prediction algorithm. That is, each trajectory, which defines a position in terms of velocity and acceleration, with some covariance describing how diffuse that distribution is may be computed. Referring to the above example, the prediction algorithm may produce a predicted position and predicted uncertainty to define a given distribution. The likelihood of the observed position under that distribution can be computed. For example, the following function can be used to compute likelihood, where the probability (observed/predicted)=normal distribution pdf (x=observed position, μ=predicted position, σ=predicted uncertainty).

$$\frac{1}{\sigma\sqrt{2\pi}}e^{-\frac{1}{2}(\frac{x-\mu}{\sigma})2}$$

The computed likelihood value can then be used as a score or "likelihood" of the prediction algorithm.

In other embodiments, likelihood can be computed based on a minimum distance to any predicted position, and a decision rule can be based on this computed likelihood. For example, planner component 212A-3 may select a prediction algorithm having the highest likelihood over the past five timesteps, where error is computed for/over each timestep. That is, the error between predicted position at t0 and the observed state at t1 can be computed, and the prediction algorithm having the lowest error over the past five timesteps can be selected.

In some embodiments, the likelihood may be computed over a longer time horizon than merely a single timestep. In some embodiments, a particular prediction algorithm, such as a physics-based prediction algorithm can be down-weighted to normalize the prediction relative to predictions from other prediction algorithms. That is, physics-based prediction algorithms may result in higher likelihoods over shorter time periods (shorter timesteps/time horizons). It should be understood that physics-based models can refer to predictions based on physical laws. Consider a scenarios where a desired prediction involves something in one dimension with a constant velocity model, i.e., [new position=current position+time delta*speed]. A "constant velocity model" can be an example of a physics-based prediction model. There are other physics-based prediction models that may consider the acceleration or curvature of an object, and all these are typically applied in two or three dimensions.

Physics-based prediction algorithms/models may tend to outperform other models because physics-based predictions makes fewer assumptions, and making few assumptions results in good performance over a short time horizon (because we know from physics that objects travel according to certain laws). For example, a lane-based prediction model might assume an obstacle will converge to a lane center and stay there. Over a short horizon, the obstacle might swerve a little, or remain offset from the lane center, but over a longer horizon it will likely converge to the lane center. In this case, the physics-based approach will perform well in the short-horizon whereas the lane-based algorithm will perform better at longer horizons. In still other embodiments, planner component 213A-2 may employ a prediction algorithm selection mechanism that requires any physics-based prediction algorithm to perform at some level higher than other approaches by some margin.

At operation 406, one of the different prediction algorithms having the highest likelihood of predicting the trajectory of the at least on object accurately is selected to perform at least one subsequent prediction regarding the trajectory of the at least one object. as discussed above, upon selection of a prediction algorithm, evaluation may continue, e.g., at timestep 0, multiple predictions may be made, and at timestep 1, algorithm performance may be determined. At timestep 2, until the end of a time horizon, that selected algorithm can be used, and this can be done for every object through the end of a time horizon.

In some instances, computing likelihood as described above may result in overly conservative prediction algorithm leading to the selection of physics-based prediction algorithms more often than may be actually warranted. As noted above, computing error over longer time horizons may mitigate the sometimes, undesirable preference for physics-based prediction algorithms. However, this may not sufficiently negate the issues associated with likelihood-based prediction algorithm selection. Moreover, as also noted above, the use of different prediction algorithms may be preferred depending on environmental conditions/considerations, such as particular locales or out-of-distribution data. Accordingly, another method may be used by planner component 212A-3 to select a prediction algorithm, i.e., by using state information/data to learn which prediction algorithm to utilize.

Figure 5:
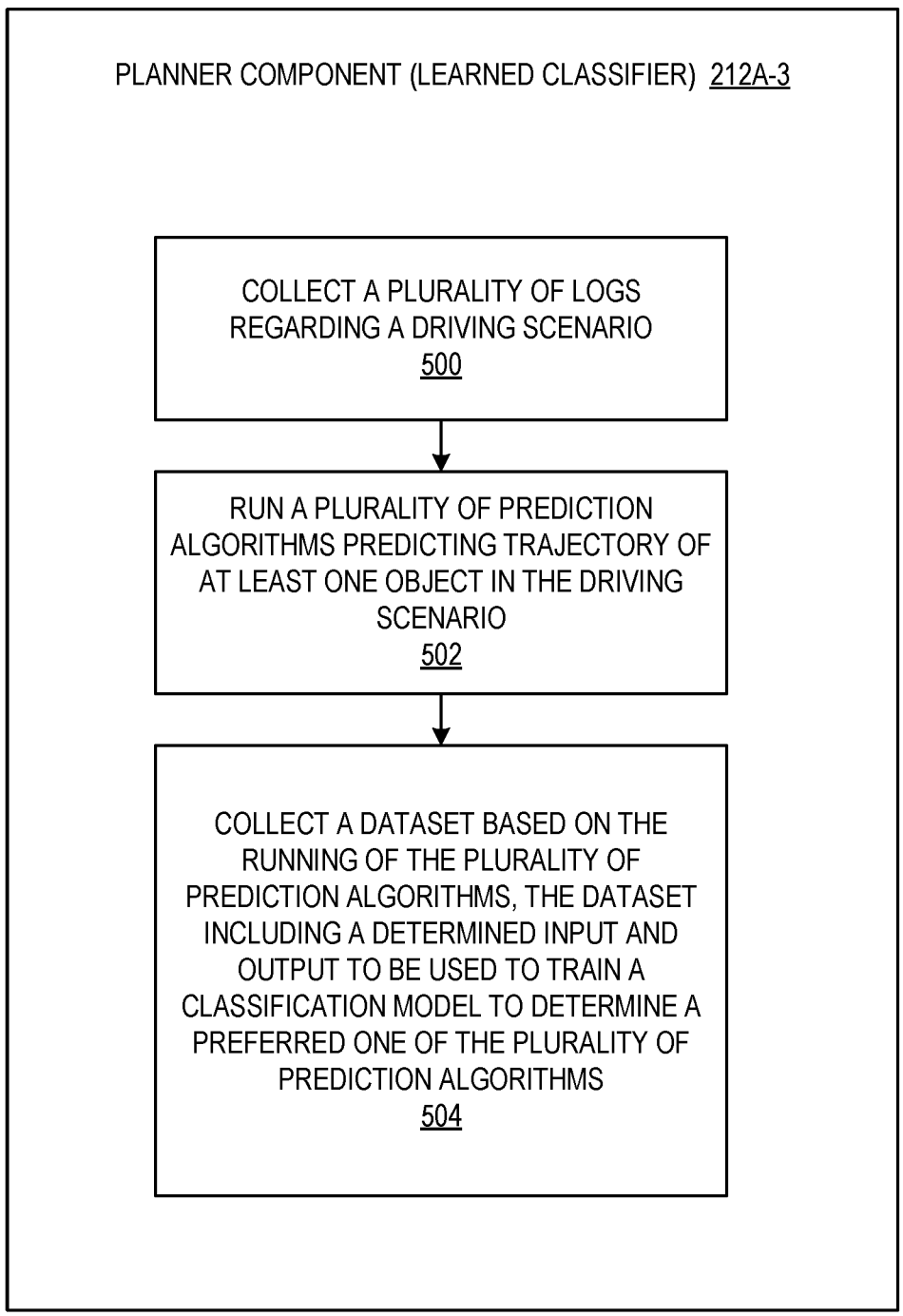
FIG. 5 is a flow chart illustrating example operations performed to select a prediction algorithm in accordance with one embodiment.

FIG. 5 is a flow chart illustrating example operations that can be performed to select a prediction algorithm based on a learned classifier. At operation 500, a plurality of logs regarding driving scenarios may be collected. Such logs reflect information regarding the driving scenarios as experienced by autonomously controlled vehicles as well as conventional non-autonomously controlled vehicles. Such logs can provide datasets on which a plurality of prediction algorithms can be applied.

Accordingly, at operation 502, a plurality of prediction algorithms predicting the trajectory of at least one object in the driving scenario(s) can be run. That is, the prediction algorithms can be applied to make predictions based on the driving scenario information contained within the logs, where the running of the prediction algorithms at this stage can occur offline, i.e., not applied in real-time as a vehicle is in operation.

Instead, the purpose of running the plurality of prediction algorithms offline on log data is to collect a dataset reflecting what may be utilized as input to train a classification model to produce a desired output, where that output is a preferred prediction algorithm to use. That is, at operation 504, a dataset based on the running of the plurality of prediction algorithms is collected, the dataset including a determined input and output to be used to train a classification model to determine a preferred one of the plurality of prediction algorithms. In this way, the classification model can be trained such that given a particular input, it should predict that output, such that when deployed, information or features commensurate with the dataset input information can be collected and the classification model (which can be a regression algorithm) can be run to make a decision as to which prediction algorithm to use.

For example, the dataset input may comprise features or characteristics of the driving scenario(s) captured by the logs. Accordingly, the dataset input may include information regarding the type of road on which a vehicle was traveling, whether the vehicle was traversing a roadway on the East Coast or on the West Coast, the number of cars surrounding the vehicle, etc. It should be noted that the level of abstraction or specificity can vary, and is programmable.

In some embodiments, the dataset output may comprise a labeled dataset, where the expected error of each of the plurality of prediction algorithms can be determined, and based on that expected error, a target value for the classification model can be determined. In some embodiments, considering some number of prediction algorithms, the error associated with predictions from each of the prediction algorithms can be determined. The best performing prediction algorithm (the one having the smallest error) can be labeled as the preferred/best prediction algorithm to use given the dataset input. In still other embodiments, determining the preferred/best prediction algorithm to use can be achieved by assessing the error associated with a prediction, and based on that error, determining whether the prediction is reliable. Thus, when the classification model is presented with a particular dataset input, e.g., certain characteristics of a driving scenario (when actually deployed in a vehicle), the classification model (having been previously trained on the log information) can output a preferred prediction algorithm to use.

It should be understood that in some embodiments the aforementioned classification model can detect the distribution of data. That is, using a Gaussian process regression model as the classification model to predict the error of different prediction algorithms, the uncertainty in the error prediction due to the distribution of input data can be estimated. It should be noted that other models can be used for this process. In this way, out-of-distribution data can be detected (which can be a significant issue in applying learned models). Thus, while a prediction algorithm itself may not be able to accurately estimate the error prediction uncertainty due to the input data distribution, the aforementioned classification model can be trained using less data or based on a lower-dimension problem, prediction algorithms that are able to recognize out-of-distribution data be used. That is, a neural network model may be trained on 100 features, but a GPR model may be trained on 5 features. The neural network would predict the trajectory, and the GPR would predict the error of the model and the uncertainty in that error based on the data.

Figure 6:
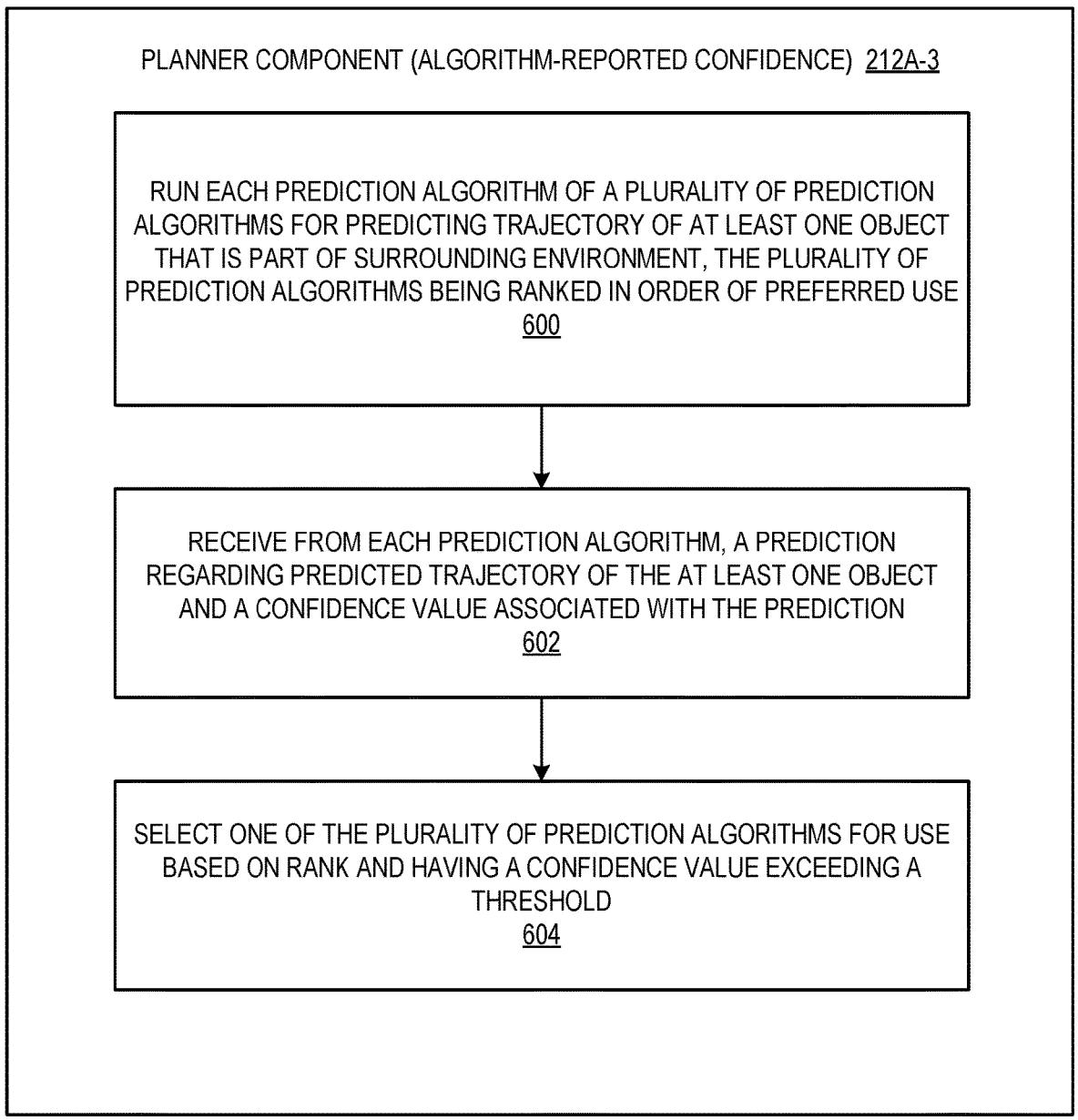
FIG. 6 is a flow chart illustrating example operations performed to select a prediction algorithm in accordance with one embodiment.
Figure 7:
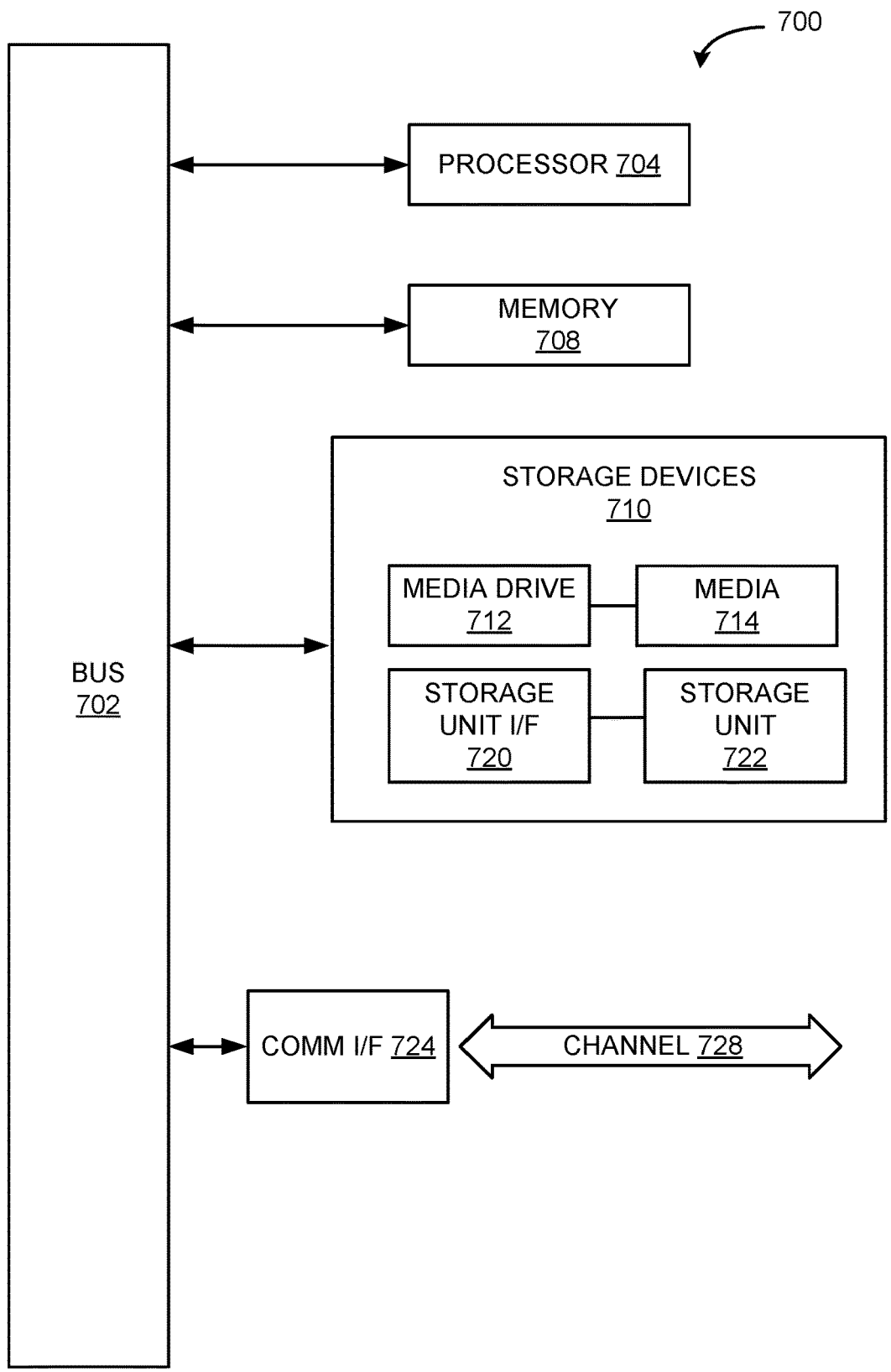
FIG. 7 is an example computing component that may be used to implement various features of embodiments described in the present disclosure.

As described above with respect to FIG. 5, instead of training a separate classification model to predict which prediction algorithm to use, prediction algorithms themselves may be able to report self-confidence in a prediction, which in turn can be the basis for selecting a particular prediction algorithm for use. FIG. 6 is a flow chart illustrating example operations that can be performed to select a prediction algorithm based on reported confidence. At operation 600, each prediction algorithm of a plurality of prediction algorithms for predicting a trajectory of at least one object that is part of a vehicle's surrounding environment, the plurality of prediction algorithms being ranked in order of preferred use. That is, similar to prediction algorithm selection based on error/likelihood, prediction component 212A-3 may apply each of a plurality of prediction algorithms to an observed state(s) of one or more objects.

At operation 602, each of the prediction algorithms, upon execution, may output an object(s) trajectory prediction along with a self-generated confidence value indicating how confident the prediction algorithm is regarding its own prediction. Each of the prediction algorithms may be assigned some priority relative to each of the other prediction algorithms (as noted above). The priority can be based, e.g., on expert knowledge, or known characteristics of the prediction algorithms, etc. That is, each of the prediction algorithms can be ranked according to use preference assuming it outputs a sufficient level of confidence associated with its prediction.

At operation 604, one of the plurality of prediction algorithms for use based on rank and having a confidence threshold meeting/exceeding a threshold. That is, planner component 212A-3 may assess each prediction algorithm in order of rank (use preference). If that prediction algorithm outputs (with its object trajectory prediction), a confidence value that meets or exceeds a determined threshold, that prediction algorithm is selected. If that prediction algorithm does not output a sufficiently high confidence value (relative to the threshold), planner component 212A-3 may assess the next highest-ranked prediction algorithm to determine if its confidence level meets/exceeds the given threshold. This can continue until planner component 212A-3 assess a prediction algorithm with the requisite confidence. For example, for different downstream applications (planning an ego-vehicle route, checking the need for intervention, warnings), confidence can be used over different time horizons to decide which predictive algorithm to use, i.e., the one that is best for the time horizon that's being planned for, etc. Another contemplated approach is in the context of an overall uncertainty for the system at different time horizons, to allow for arbitrating of possible actions (such as warning or intervening).

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
   an autonomous control system adapted to provide one or more commands to autonomously control one or more systems of the vehicle;
   an obstacle recognition unit adapted to:
      apply a plurality of prediction algorithms to a state of an object generating a plurality of predictions regarding object trajectory;
      determine which of the plurality of prediction algorithms generates a most accurate prediction of the plurality of predictions regarding trajectory of the object by collecting log data from a plurality of vehicles and applying each of the plurality of prediction algorithms to the collected log data;
      collect a dataset from the application of each of the plurality of prediction algorithms, the dataset comprising a first subset of data to be used as input to a classification algorithm, the first subset of data comprising one or more characteristics of a driving experience represented by the collected log data, and a second subset of data to be specified as a desired output of the classification algorithm, the desired output comprising one of the plurality of prediction algorithms generating the most accurate prediction; and
   a navigation plan generation unit adapted to generate a navigation plan based on the most accurate prediction of the plurality of predictions regarding the trajectory of the object and according to which, the vehicle is autonomously controlled, the prediction algorithm of the plurality of prediction algorithms generating the most accurate prediction being subsequently applied to another object, generating a subsequent prediction, and generating another navigation plan or portion of the navigation plan based on the subsequent prediction.

2. The vehicle of claim 1, wherein to determine which of the plurality of prediction algorithms generates a most accurate prediction, the obstacle recognition unit predicts a position of the object at a first timestep using each of the plurality of prediction algorithms.

3. The vehicle of claim 2, wherein the obstacle recognition unit further determines an actual position of the object at a second timestep subsequent to the first timestep.

4. The vehicle of claim 3, wherein the obstacle recognition unit further computes a likelihood associated with each of the plurality of prediction algorithms based on a comparison between the predicted position of the object and the actual position of the object.

5. The vehicle of claim 3, wherein the obstacle recognition unit further computes a likelihood associated with each of the plurality of prediction algorithms over a set of past timesteps, wherein error associated with each predicted position of the object is computed at each timestep of the set of past timesteps.

6. The vehicle of claim 1, wherein the obstacle recognition unit determines the desired output based on the one of the plurality of prediction algorithms having a lowest error over a given time horizon or a per-prediction algorithm reliability assessment.

7. The vehicle of claim 6, wherein the obstacle recognition unit further deploys the one of the plurality of prediction algorithms generating the most accurate prediction, and upon receiving data commensurate with the first subset of data used as the input to the classification algorithm, outputs the one of the plurality of prediction algorithms to predict a trajectory of one or more obstacles currently encountered by the vehicle.

8. The vehicle of claim 1, wherein to determine which of the plurality of prediction algorithms generates a most accurate prediction, the obstacle recognition unit determines a confidence value associated with each of the plurality of prediction algorithms.

9. The vehicle of claim 8, wherein the obstacle recognition unit further determines a priority of use of the plurality of prediction algorithms, and wherein the obstacle recognition unit selects one of the plurality of prediction algorithms to predict a trajectory of one or more obstacles currently encountered by the vehicle based on the priority of use and whether the confidence value associated the one of the plurality of prediction algorithms meets or exceeds a confidence threshold.

10. The vehicle of claim 1, wherein the determining of which of the plurality of prediction algorithms generates the most accurate prediction of the plurality of predictions regarding trajectory of the object is performed at each of a plurality of timesteps.

11. The vehicle of claim 10, wherein the determining of which of the plurality of prediction algorithms generates the most accurate prediction of the plurality of predictions regarding trajectory of the object comprises determining an error associated with each of the plurality of prediction algorithms at each of the plurality of timesteps.

12. The vehicle of claim 11, wherein the determining of which of the plurality of prediction algorithms generates the most accurate prediction of the plurality of predictions regarding trajectory of the object further comprises applying a weighting filter to the error associated with each of the plurality of prediction algorithms.

13. The vehicle of claim 12, wherein the weighting filter weighs errors associated with past timesteps differently than errors associated with a current timestep.

14. The vehicle of claim 1, wherein the most accurate prediction of the plurality of predictions regarding trajectory of the object differs according to at least one of downstream application and time horizon under consideration.

15. A method of autonomously controlling a vehicle, comprising:
  generating a plurality of predictions regarding trajectory of an object based on a state of the object at one or more timesteps;
  determining which of a plurality of prediction algorithms, which generate the plurality of predictions, results in a most accurate prediction of the trajectory of the object by determining which of the plurality of predictions has a highest confidence level or a lowest error;
  determining which of the plurality of prediction algorithms is associated with a highest priority when two or more of the plurality of predictions algorithms generating predictions having the same confidence level or some error;
  generating a navigation plan based on the most accurate prediction of the plurality of predictions regarding the trajectory of the object;
  generating control signals to autonomously control the vehicle in accordance with the navigation plan;
  generating a subsequent prediction regarding trajectory of another object using the prediction algorithm of the plurality of prediction algorithms generating the most accurate prediction when at least one of the other object is similar to the object, an environment in which the other object is encountered is similar to that of the object, or operating conditions of the vehicle upon encountering the other object is similar to those encountered with the object; and
  generating another navigation plan or portion of the navigation plan based on the subsequent prediction.

* * * * *